US011688330B2

(12) United States Patent
Kim et al.

(10) Patent No.: US 11,688,330 B2
(45) Date of Patent: Jun. 27, 2023

(54) DISPLAY APPARATUS AND CONTROLLING METHOD THEREOF

(71) Applicant: Samsung Electronics Co., Ltd., Suwon-si (KR)

(72) Inventors: Sangheon Kim, Suwon-si (KR); Myungyeol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/894,467

(22) Filed: Aug. 24, 2022

(65) Prior Publication Data

US 2023/0169910 A1 Jun. 1, 2023

Related U.S. Application Data

(63) Continuation of application No. PCT/KR2022/011731, filed on Aug. 8, 2022.

(30) Foreign Application Priority Data

Nov. 29, 2021 (KR) .................. 10-2021-0167318

(51) Int. Cl.
*G09G 3/20* (2006.01)
*G06F 3/14* (2006.01)

(52) U.S. Cl.
CPC ......... *G09G 3/2096* (2013.01); *G06F 3/1423* (2013.01); *G09G 2320/08* (2013.01);
(Continued)

(58) Field of Classification Search
CPC ............. G09G 3/2096; G09G 2320/08; G09G 2370/04; G09G 2370/12; G09G 2370/22; G06F 3/1423
See application file for complete search history.

(56) References Cited

U.S. PATENT DOCUMENTS 8,352,642 B2 1/2013 Hsu et al.
8,854,547 B2 10/2014 Yoshida
(Continued)

FOREIGN PATENT DOCUMENTS

CN 102469289 A 5/2012
JP 6112170 B2 4/2017
(Continued)

OTHER PUBLICATIONS

International Search Report dated Nov. 17, 2022, issued in International Patent Application No. PCT/KR2022/011731.

*Primary Examiner* — Abbas I Abdulselam
(74) *Attorney, Agent, or Firm* — Jefferson IP Law, LLP

(57) ABSTRACT

A display apparatus and a controlling method are provided. The display apparatus includes a communication interface to communicate with an external device, a display, and a processor which, in response to connecting to a plurality of external devices, may identify one external device based on usage history, identify whether the external device is turned on based on a clock signal included in an input signal of the identified external device, based on the identified external device not being turned on, transmit a control signal to turn on the external device to the external device, identify a feature of content provided by the identified external device, change an output setting state of the display corresponding to the identified feature of the content, and based on receiving content from the external device, control the display to display the received content based on the changed output setting state of the display.

18 Claims, 10 Drawing Sheets

(52) U.S. Cl.
CPC ..... *G09G 2370/04* (2013.01); *G09G 2370/12* (2013.01); *G09G 2370/22* (2013.01)

(56) References Cited

U.S. PATENT DOCUMENTS

| | | |
|---|---|---|
| 9,237,360 B2 | 1/2016 | Bae et al. |
| 11,350,158 B2 | 5/2022 | Shin et al. |
| 2015/0071603 A1 | 3/2015 | Bae et al. |
| 2021/0064335 A1 | 3/2021 | Kim |
| 2021/0084366 A1 | 3/2021 | Yun et al. |
| 2021/0185389 A1 | 6/2021 | Shin et al. |

FOREIGN PATENT DOCUMENTS

| | | |
|---|---|---|
| KR | 10-2010-0042419 A | 4/2010 |
| KR | 10-2015-0030360 A | 3/2015 |
| KR | 10-2019-0087197 A | 7/2019 |
| KR | 10-2020-0029854 A | 3/2020 |
| KR | 10-2020-0075300 A | 6/2020 |
| KR | 10-2220108 B1 | 2/2021 |

FIG. 1

THERE IS NO INPUT SIGNAL.
HDMI2

(1) PLEASE CHECK POWER STATE OF EXTERNAL
    DEVICE AND NORMAL CONNECTION OF CABLE.
(2) PLEASE PRESS TV/HDMI KEY TO TURN TO THE
    INPUT MODE.

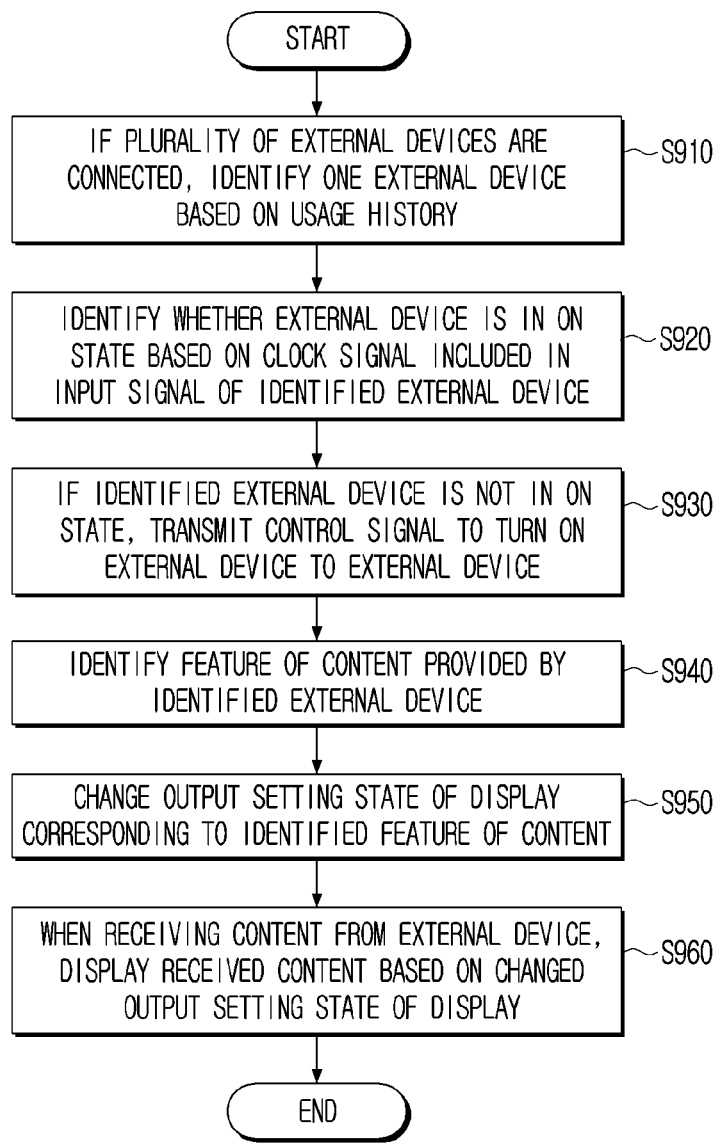

DISPLAY APPARATUS AND CONTROLLING METHOD THEREOF

CROSS-REFERENCE TO RELATED APPLICATION(S)

This application is a continuation application, claiming priority under § 365(c), of an International application No. PCT/KR2022/011731, filed on Aug. 8, 2022, which is based on and claims the benefit of a Korean patent application number 10-2021-0167318, filed on Nov. 29, 2021 in the Korean Intellectual Property Office, the disclosure of which is incorporated by reference herein in its entirety.

BACKGROUND

1. Field

The disclosure relates to a display apparatus and a controlling method thereof. More particularly, the disclosure relates to a display apparatus automatically converting an input signal of an external device and a controlling method thereof.

2. Description of the Related Art

A variety of electronic devices are being used at homes. For example, various electronic devices include electronic devices such as set-top boxes, over-the-top (OTT) boxes, video game consoles, smartphones, and the like. The above-described electronic device may be connected to the display apparatus in a wired or wireless manner, and may display an image through the display apparatus.

Accordingly, the display apparatus includes a communication interface or an input/output interface capable of receiving input signals from various electronic devices. In order for the display apparatus to normally display the input signal received from the electronic device, the input port to which the electronic device is connected, transmission method, channel, or the like, etc. needs to be set correctly.

If the display apparatus is connected only to one electronic device, it is possible to maintain the initial connection setting state between the display apparatus and the electronic device, so that the display apparatus may receive the input signal from the electronic device at any time and display a normal image.

However, if the display apparatus is connected to a plurality of electronic devices, the correct connection between the display apparatus and the currently connected electronic device among the plurality of electronic devices should be set.

FIG. 1 is a diagram illustrating a guide message displayed on a display apparatus according to the related art.

Referring to FIG. 1, if the correct connection between the display apparatus and the currently connected electronic device is not set, the display apparatus may display a guide message, as shown in FIG. 1. A display apparatus that displays a guide message may not have a failure, but may give a user inconvenience. In addition, a user who is not skillful in handling the electronic device may have a difficulty in setting the correct connection state between the display apparatus and the electronic device.

Therefore, there is a necessity of technology of automatically setting a connection state between a display apparatus and an external device.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address the above-mentioned problems and/or disadvantages and to provide at least the advantages described below. Accordingly, an aspect of the disclosure is to provide a display apparatus that automatically sets a connection state with an external device and automatically changes a setting state of a display corresponding to an input signal of an external device.

Additional aspects will be set forth in part in the description which follows and, in part, will be apparent from the description, or may be learned by practice of the presented embodiments.

In accordance with an aspect of the disclosure, a display apparatus is provided. The display apparatus includes a communication interface to communicate with an external device, a display, and a processor which, in response to connecting to a plurality of external devices, may identify one external device based on usage history, identify whether the external device is turned on based on a clock signal included in an input signal of the identified external device, based on the identified external device not being turned on, transmit a control signal to turn on the external device to the external device, identify a feature of content provided by the identified external device, change an output setting state of the display corresponding to the identified feature of the content, and based on receiving content from the external device, control the display to display the received content based on the changed output setting state of the display.

In accordance with another aspect of the disclosure, a method of controlling of a display apparatus is provided. The method includes, in response to connecting to a plurality of external devices, identifying one external device based on usage history, identifying whether the external device is turned on based on a clock signal included in an input signal of the identified external device, based on the identified external device not being turned on, transmitting a control signal to turn on the external device to the external device, identifying a feature of content provided by the identified external device, changing an output setting state of the display corresponding to the identified feature of the content, and based on receiving content from the external device, displaying the received content based on the changed output setting state of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWING FIGURES

The above and other aspects, features, and advantages of certain embodiments of the disclosure will be more apparent from the following description taken in conjunction with the accompanying drawings, in which:

FIG. 1 is a diagram illustrating a guide message displayed on a display apparatus according to the related art;

FIG. 9 is a flowchart illustrating a controlling method of a display apparatus according to an embodiment of the disclosure.

Throughout the drawings, it should be noted that like reference numbers are used to depict the same or similar elements, features, and structures.

DETAILED DESCRIPTION OF THE EMBODIMENTS

Figure 2:
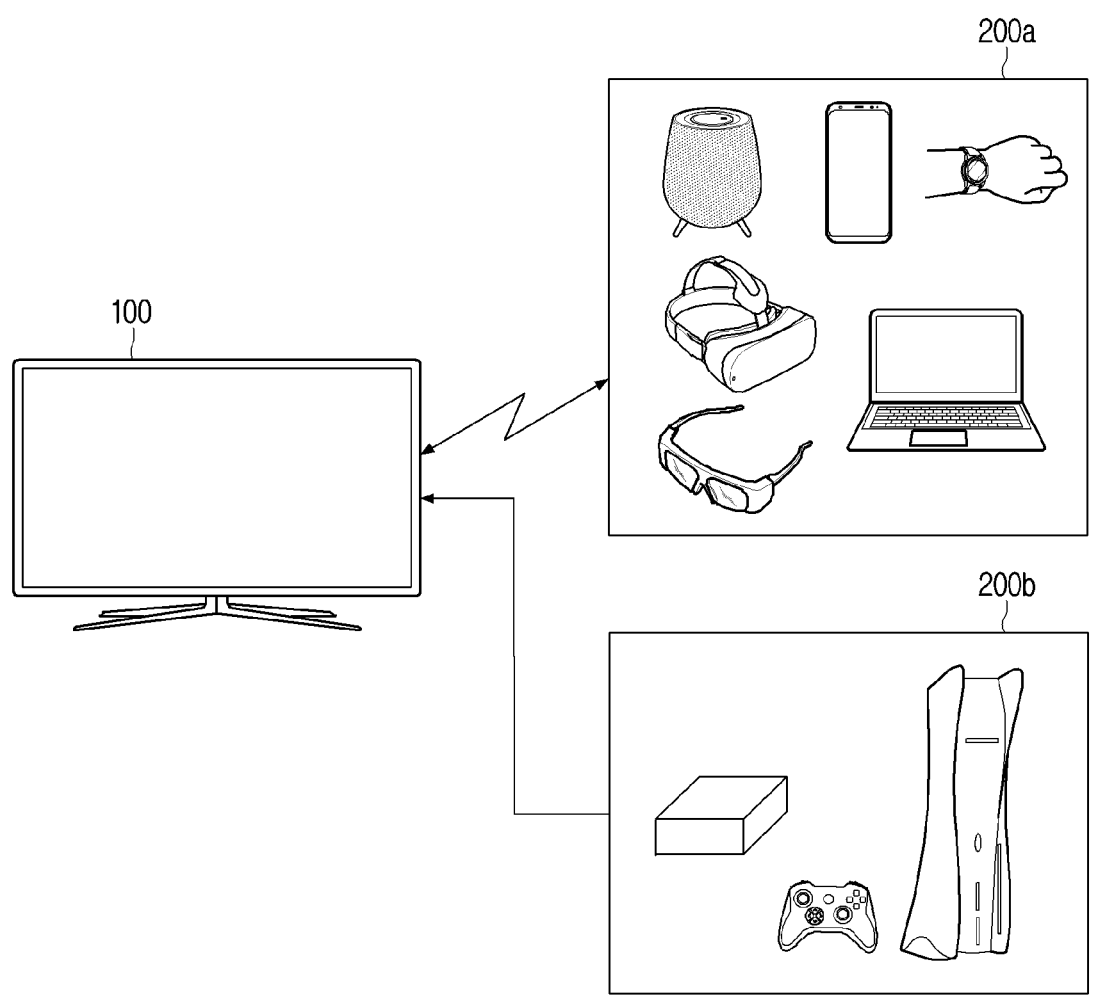
FIG. 2 is a diagram illustrating an external device connected to a display apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the terms "first, second, and so forth" are used to describe diverse elements regardless of their order and/or importance and to discriminate one element from other elements, but are not limited to the corresponding elements.

In this disclosure, the terms "comprises" or "having" and the like are used to specify that there is a feature, number, step, operation, element, part or combination thereof described in the specification, but do not preclude the presence or addition of one or more other features, numbers, steps, operations, elements, parts, or combinations thereof. It is to be understood that when an element is referred to as being "coupled" or "connected" to another element, it may be directly coupled or connected to the other element, or any other element may be interposed therebetween. In the meantime, when an element is referred to as being "directly coupled" or "directly connected" to another element, it should be understood that no other element is present therebetween.

In the disclosure, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/~or" that needs to be implemented by specific hardware. Singular forms are intended to include plural forms unless the context clearly indicates otherwise.

In the description of the disclosure, the order of each operation should be understood non-restrictively unless a preceding operation must be performed before a subsequent operation logically and temporally. That is, except for the exceptional case above, although a process described as a subsequent operation is performed before a process described as a preceding operation, it does not affect the essence of the disclosure and the scope of the disclosure should be defined regardless of order of operations. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non- exclusive sense to include any other component.

When it is decided that a detailed description for the known art related to the disclosure may unnecessarily obscure the gist of the disclosure, the detailed description will be reduced or omitted. Each embodiment may be implemented or operated independently, but each embodiment may be implemented or operated in combination.

FIG. 2 is a diagram illustrating an external device connected to a display apparatus according to an embodiment of the disclosure.

Referring to FIG. 2, a display apparatus 100 and various external devices 200a, 200b are illustrated. The various external devices 200a, 200b may be connected to the display apparatus 100 using wired/wireless communication method.

For example, a first type external device 200a may be connected to the display apparatus 100 in a wireless communication manner. In one embodiment, the wireless communication scheme may include third generation (3G), long term evolution (LTE), fifth generation (5G), wireless-fidelity (Wi-Fi), Bluetooth™, digital multimedia broadcasting (DMB), advanced television systems committee (ATSC), digital video broadcasting (DVB), local area network (LAN), and the like. The first type external device 200a may include an artificial intelligence (AI) speaker, a smartphone, a tablet personal computer (PC), a laptop computer, a wearable device, and the like. A second type external device 200b may be connected to the display apparatus 100 through a wired communication method. As an example, the wired communication method may include a High-Definition Multimedia Interface (HDMI), a Universal Serial Bus (USB), Thunderbolt, a Local Area Network (LAN), OPTICON, AVI/COMPONENTE VGA/AUDIO, D-Sub, and the like. The second type external device 200b may include a set-top box (STB), an optical disc drive (ODD), a video player, a game machine, and the like.

The example and type of the external device described above is merely an example and one device may be connected to the display apparatus 100 through various methods. For example, a tablet PC may be connected to the display apparatus 100 through wireless communication, or may be connected through wired communication.

The display apparatus 100 may detect the first type external device 200a connected in a wireless communication method. As an example, the display apparatus 100 may detect the first type external device 200a using a device to device (D2D), a server, a cloud, or the like. Alternatively, the display apparatus 100 may detect the second type external device 200b) connected in a wired communication manner. In one embodiment, the hot plug detect (HPD) of the HDMI may sense whether the second type external device 200b is connected to the display apparatus 100.

The display apparatus 100 may determine a type of a signal connected to the external devices 200a, 200b and a power state of an external device, or the like, based on an input signal of the connected external devices 200a, 200b. The input signal of the external devices 200a, 200b may include a data signal and a clock signal. Since the clock signal is a signal that is input at a predetermined period, the display apparatus 100 may determine the power state of the external devices 200a and 200b based on a clock signal inputted at a predetermined period. For example, when a clock signal is input from the connected external devices 200a and 200b, the display apparatus 100 may determine that power of the external devices 200a and 200b is turned on. Alternatively, if the clock signal is not input from the connected external devices 200a and 200b, the display apparatus 100 may determine that the power of the connected external devices 200a and 200b is turned off. A clock signal may not be included in an input signal according to a format of an input signal. The display apparatus 100 may separate a clock signal from the input signal from the external devices 200a, 200b and may identify whether a device of the external devices 200a, 200b is turned on based on the separated clock signal.

The display apparatus 100 may select one of the various external devices 200a and 200b according to a predetermined reference. For example, display apparatus 100 may select one device based on usage history using external devices 200a and 200b of a user. When the selected apparatus is powered off, the display apparatus 100 may transmit a control signal to turn on the power to the selected apparatus and receive data from the selected device. Alternatively, the display apparatus 100 may select one device based on the power state of the external devices 200a and 200b. The display apparatus 100 may select a device of which power is turned on and may receive data from the selected device.

The display apparatus 100 may receive information about an external device from the external devices 200a and 200b upon initial connection with the external devices 200a and 200b. The display apparatus 100 may store information about the received external device. Thus, the display apparatus 100 may identify connected external devices (or selected devices) and provided data (or content) even before receiving data from the external devices 200a, 200b.

The display apparatus 100 may change the output state of the display based on data provided from the connected external device. The output state of the display may mean an output setting value of the display. For example, the output setting value may include a setting value such as resolution, brightness, contrast ratio, color temperature, text style, and text size. In one embodiment, if an external device connected to the display apparatus 100 is a video game console, the display apparatus 100 may change the output state of the display to an optimal state for the game content.

The display apparatus 100 may receive data from a connected device and may display received data based on the changed output setting state of the display.

A configuration of the display apparatus 100 will be described below.

Figure 3:
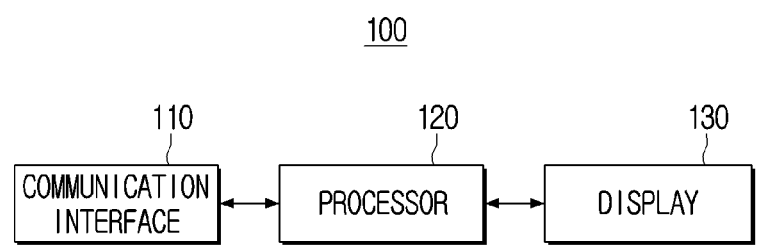
FIG. 3 is a block diagram illustrating a configuration of a display apparatus according to an embodiment of the disclosure.

FIG. 3 is a block diagram illustrating a configuration of a display apparatus according to an embodiment of the disclosure.

Referring to FIG. 3, a display apparatus 100 may include a communication interface 110, a processor 120, and a display 130.

The communication interface 110 communicates with an external device. For example, the external device may include an AI speaker, a smartphone, a tablet PC, a laptop computer, a wearable device, a Set-Top Box (STB), an Optical Disc Drive (ODD), a video player, a video game console, a server, a cloud, and the like. The communication interface 110 may receive an input signal and content from an external device and transmit a control signal.

For example, the communication interface 110 may include a module capable of communicating in a manner such as 3G, LTE, 5G, Wi-Fi, Bluetooth™, DMB, ATSC, DVB, LAN, etc. Alternatively, the communication interface 110 may include a module capable of performing communication in a manner such as an HDMI, a USB, Thunderbolt, LAN, OPTICON, AVI/COMPONENTE VGA/AUDIO, and D-Sub, or the like.

The communication interface 110 may receive a signal or the like from an external device such as a remote controller. The processor 120 may recognize a control command based on the signal. A communication interface for communicating with an external device may be referred to as a communicator, a communication module, a transceiver, or the like.

The processor 120 may control each configuration of the display apparatus 100. For example, the processor 120 may control the communication interface 110 to receive an input signal, content, and transmit a control signal from an external device. The processor 120 may control the display 130 to output an image signal of the received content. Alternatively, the processor 120 may control the display 130 to output information associated with an external device or an input signal.

The processor 120 may identify an external device to receive content. When a plurality of external devices are connected, the processor 120 may identify one external device according to certain criteria. For example, the processor 120 may identify one external device based on power state of the external device. Alternatively, the processor 120 may identify one external device based on the usage history.

The processor 120 may identify whether the power state of the external device is on or off. For example, the processor 120 may identify a power state of the external device based on a clock signal included in an input signal of an external device. The clock signal is a signal having a predetermined period. If the external device is in an on state, the external device may transmit a clock signal to the display apparatus 100. Accordingly, when a clock signal is received from an external device, the display apparatus 100 may identify that the power state of the external device is on. If the external device is in an off state, the external device will not transmit a signal to the display apparatus 100. Therefore, if the display apparatus 100 does not receive the clock signal from the external device, the display apparatus 100 may identify that the power state of the external device is in an off state.

A clock signal may not be included in a signal of an external device according to a format of an input signal or a communication method. As an embodiment, if the signal input from an external device is HDMI 2.1, the input signal may be in a formation of fixed rate link (FRL) and a signal of all lines may be a data signal. The clock signal may be included in a data signal and transmitted.

The processor 120 may separate a clock signal by changing an FRL format to transition minimized differential signaling (TMDS) format. The processor 120 may determine a power state of an external device based on a divided clock signal.

For example, if the processor 120 selects an external device based on usage history, power state of the selected external device may be an off state. The processor 120 may transmit a control signal to turn-on the selected external device through the communication interface 110. The external device receiving the turn-on control signal may be an on-state and may transmit various data and content to transmit content to the display apparatus 100.

The display apparatus 100 may include information of an external device. For example, the information of the external device may include the type of external device, the model name, the type of signal, the features of the content, the output information for the image and sound, and the like. The display apparatus 100 may receive and store information from the external device upon the initial connection with the external device. Accordingly, thereafter, even if the power state of the external device is in the off state, the display apparatus 100 may know the information about the external device when the selected external device is identified. The external device may also know the information of the connected display apparatus 100 in the same manner.

The processor 120 may set a receiving state corresponding to the signal of the identified external device. The processor 120 may identify features of the content provided by the external device and change the output setting state of the display corresponding to the identified features of the content. For example, the processor 120 may change a signal receiving setting state in a method corresponding to a method of a signal input from the identified external device. The processor 120 may control the communication interface 110 to change a receiving channel to a channel to which the identified external device is connected.

In one embodiment, if the input signal method is set to USB, and the input signal method of the selected external device is HDMI, the display apparatus 100 may change the input signal method to an HDMI. If the channel (or port) set to be connected is number 1 and the channel (or port) of the selected external device is number 2, the display apparatus 100 may change the setting state to channel 2.

The processor 120 may adjust an output setting state of the display based on output setting history of displaying the identified content. As an embodiment, the output setting state of the display may include at least one of resolution, brightness, contrast ratio, color temperature, text style, or text size.

The display 130 may display data (e.g., content) received from an external device. The display 130 may display data received based on the output setting state of the changed display. For example, the display 130 may be implemented as a liquid crystal display (LCD) panel, an organic light emitting diode (OLED) display, a flexible display, a touch screen, or the like. When the display 130 is implemented as a touch screen, the display apparatus 100 may receive a control command through a touch screen.

Figure 4:
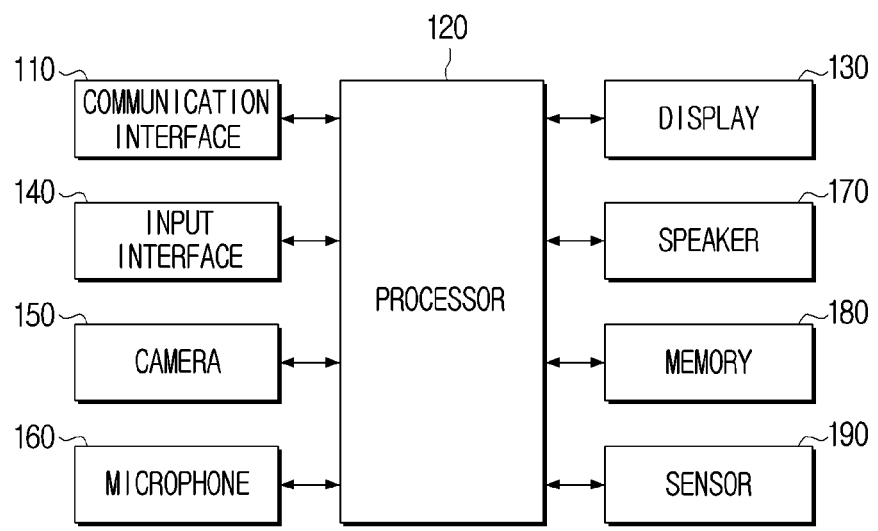
FIG. 4 is a block diagram illustrating a specific configuration of a display apparatus according to an embodiment of the disclosure.

FIG. 4 is a block diagram illustrating a specific configuration of a display apparatus according to an embodiment of the disclosure.

Referring to FIG. 4, a display apparatus 100 may include the communication interface 110, the processor 120, the display 130, an input interface 140, a camera 150, a microphone 160, a memory 180, and a sensor 190. Since the communication interface 110 and the display 130 are the same as those described in FIG. 3, a detailed description thereof will be omitted.

The input interface 140 may receive a control command from a user. For example, the input interface 140 may be implemented as a keypad, a touch pad, or the like. The input interface 140 may receive a command from a user and may be referred to as an inputter, an input module, or the like.

The camera 150 may capture the surrounding environment, including the user. The processor 120 may identify the object based on the captured image. Alternatively, the processor 120 may identify the user's motion or location based on the captured image.

The microphone 160 may receive an audio signal. The input audio signal may be processed by the processor 120, output via a speaker 170, or transmitted to an external device via the communication interface 110.

The memory 180 may store data and algorithms for performing the functions of the display apparatus 100, and may store programs, instructions, and the like driven by the display apparatus 100. The memory 180 may store the device usage history of a user and information related to the external device. For example, the device usage history may include information about the use time, the external device used, the user, and the like. The memory 180 may be a read only memory (ROM), a random access memory (RAM), a hard disk drive (HDD), a solid state drive (SSD), a memory card, or the like.

The sensor 190 may sense an environment, an object, or a user around the display apparatus 100. For example, the sensor 190 may include an image sensor, a motion recognition sensor, a proximity sensor, a thermal sensor, a touch sensor, an infrared sensor, an ultrasonic sensor, a geomagnetic sensor, and the like.

The configuration of the display apparatus 100 has been described. Hereinafter, a process of changing an output setting state according to content provided by an external device, a power state identification of an external device, an external device selection, are described below.

Figure 5:
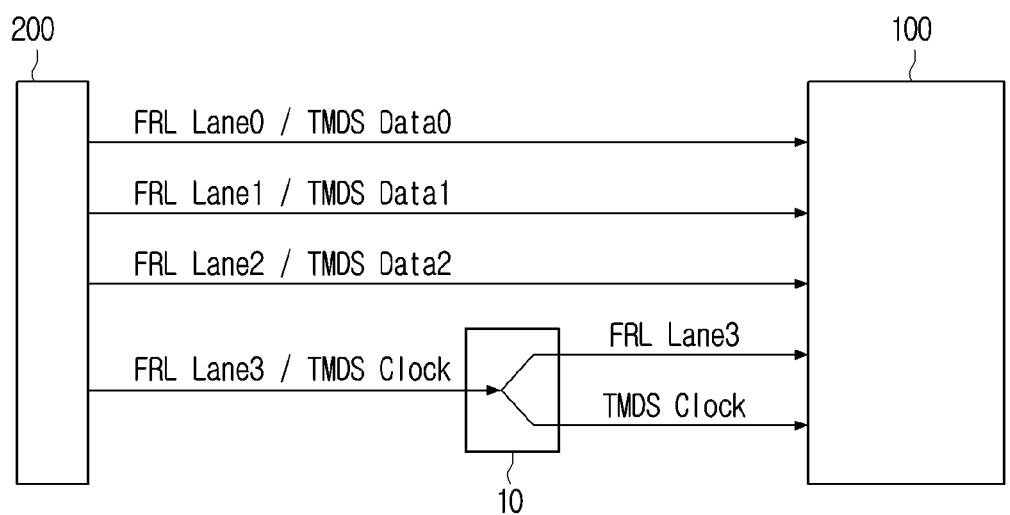
FIG. 5 is a diagram illustrating separation of a clock signal from an input signal of an external device according to an embodiment of the disclosure.

FIG. 5 is a diagram illustrating separation of a clock signal from an input signal of an external device according to an embodiment of the disclosure.

Referring to FIG. 5, a process of disconnecting the clock signal by a display apparatus 100 is shown. As described above, the display apparatus 100 may determine the power supply state of an external device 200 based on the clock signal input from the external device 200. However, the input signal provided by the external device 200 may not include a clock signal. As one embodiment, in the case of HDMI, which is one of the input signal methods, the TMDS format was used until HDMI 2.0, and the TMDS format consisted of a clock, data 0, data 1, and data 2 lines. However, the HDMI 2.1 uses the FRL format, and the FRL format consists of data lines altogether. Referring to FIG. 5, lines 0 to 2 of the FRL format correspond to data lines 0 to 2 of the TMDS format, and line 3 of the FRL format correspond to the clock line of the TMDS format.

As one embodiment, when the input signal method is HDMI 2.1, the display apparatus 100 may separate the clock signal by changing the FRL format to the TMDS format. The display apparatus 100 may use a multiplexer (MUX) 10 to separate the signal of line 3 in FRL format into a signal of the data line FRL Lane 3 and a clock signal (TMDS Clock). In addition, the display apparatus 100 may determine the power supply state of the external device 200 based on the separated clock signal.

Figure 6A:
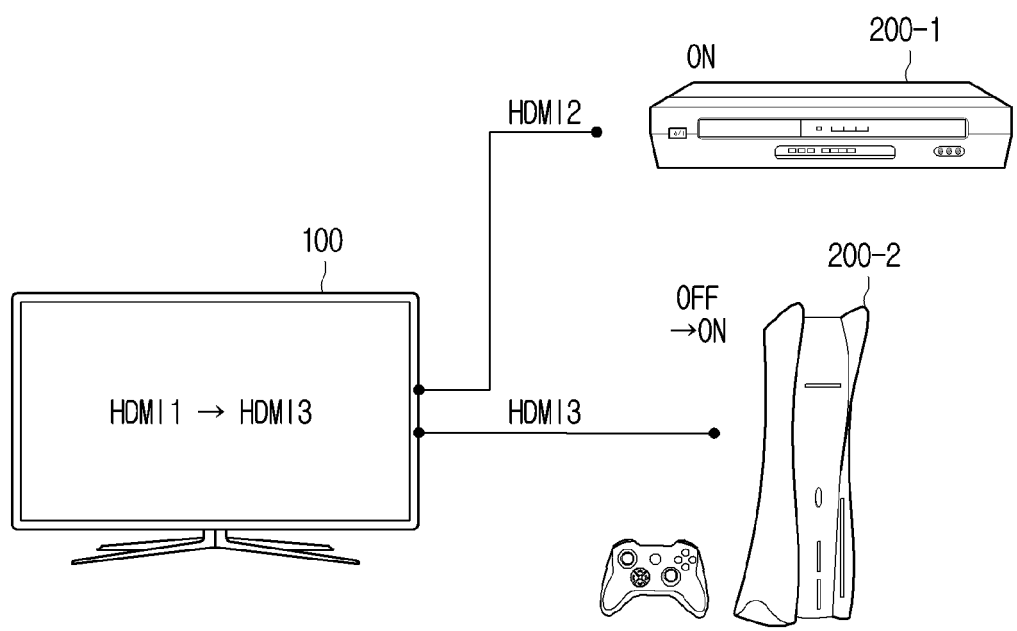
FIGS. 6A and 6B are diagrams illustrating a process of connecting a display apparatus with one external device among a plurality of external devices according to various embodiments of the disclosure.
Figure 6B:
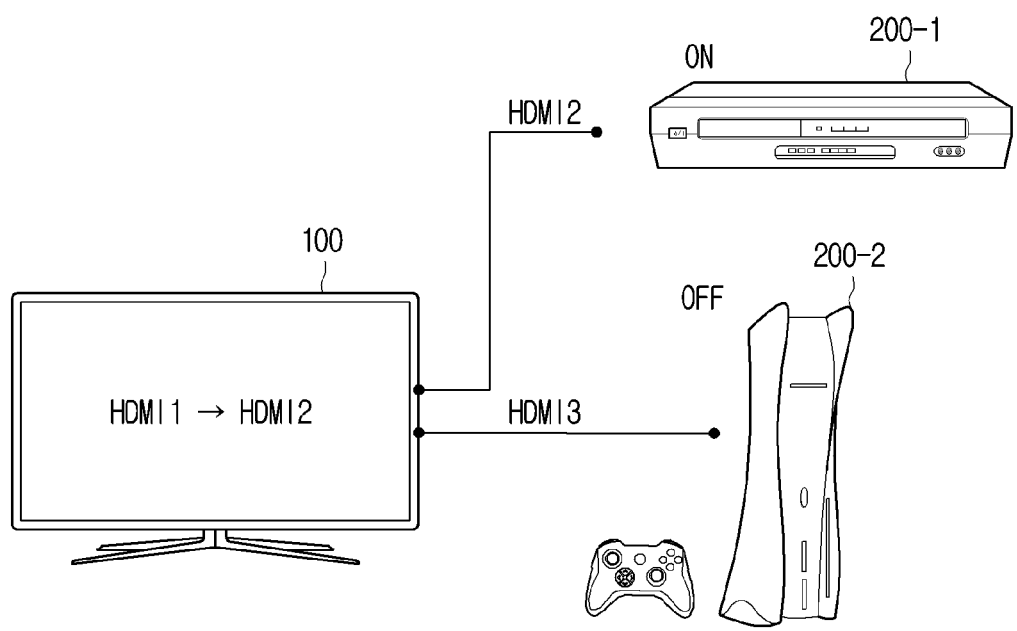

FIGS. 6A and 6B are diagrams illustrating a process of connecting a display apparatus with one external device among a plurality of external devices according to various embodiments of the disclosure.

Referring to FIGS. 6A and 6B, two external devices 200-1 and 200-2 are connected to a display apparatus 100. As one embodiment, a first external device 200-1 of the two external devices may be a set-top box, and a second external device 200-2 may be a video game console. The power state of the first external device 200-1 nay be the on state, and the power state of the second external device 200-2 may be the off state.

The display apparatus 100 may select one external device based on the usage history. For example, the display apparatus 100 may include usage history information in which the user uses the second external device (video game console) 200-2 from 7 p.m. to 9 p.m. When a user connects the display apparatus 100 with the external device at 8:00 PM, the display apparatus 100 may select the second external device 200-2 based on the usage history information. The display apparatus 100 may determine the power supply state of the second external device 200-2. As illustrated in FIG. 6A, since the power state of the second external device 200-2 is an off state, the display apparatus 100 may determine that the second external device 200-2 is in an off state based on the signal (e.g., clock signal) input from the second external device 200-2. The display apparatus 100 may transmit a turn-on signal to the second external device 200-2, and the second external device 200-2 may be turned on based on the control signal received from the display apparatus 100. As described above, the display apparatus 100 may know information about the second external device 200-2. Accordingly, the display apparatus 100 may change the receiving setting state, change the channel, adjust the display output setting state, and the like, to receive content from the second external device 200-2. For example, the current setting channel of the display apparatus 100 may be HDMI 1, and the second external device 200-2 may be connected to an HDMI 3 channel. The display apparatus 100 may change the HDMI 1 channel to the HDMI 3 channel. The display apparatus 100 may receive content from the second external device 200-2 and display the content based on the changed or adjusted state.

The display apparatus 100 may select one external device based on the power state of the external device. For example, the display apparatus 100 may determine the power state of the external devices 200-1 and 200-2. As shown in FIG. 6B, the power state of the first external device 200-1 may be an on state, and the power state of the second external device 200-2 may be an off state. The display apparatus 100 may select the first external device 200-1 based on the power state of the external device. As described above, the display apparatus 100 may know information about the first external device 200-1. Accordingly, the display apparatus 100 may change a receiving setting state, change a channel, adjust an output setting state, etc. to receive contents from the first external device 200-1. For example, the current setting channel of the display apparatus 100 may be HDMI 1, and the first external device 200-1 may be connected to the HDMI 2 channel. The display apparatus 100 may change the HDMI 1 channel to the HDMI 2 channel. The display apparatus 100 may receive and display content from the first external device 200-based on a change or adjusted state and display the content.

Figure 7:
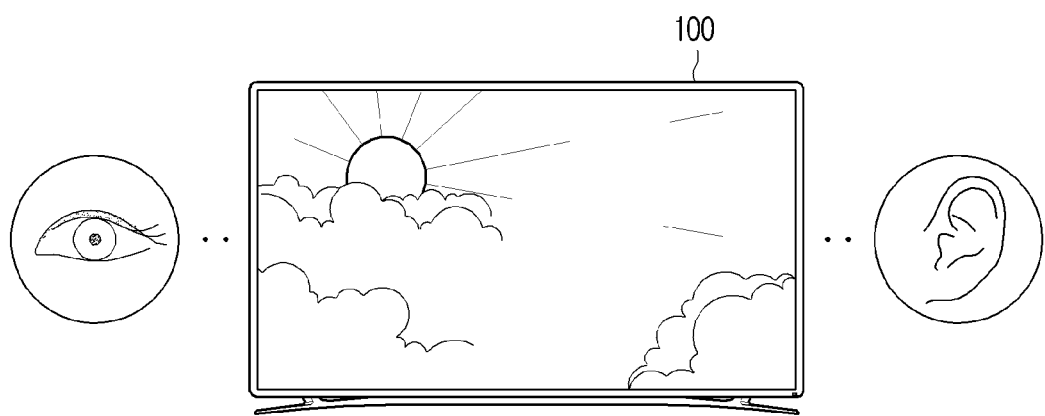
FIG. 7 is a diagram illustrating a process of adjusting an output setting state of a display apparatus according to an embodiment of the disclosure.

FIG. 7 is a diagram illustrating a process of adjusting an output setting state of a display apparatus according to an embodiment of the disclosure.

Referring to FIG. 7, a display apparatus 100 may adjust an output setting state based on information on the selected external device. For example, the display apparatus 100 may store an output setting history of displaying content. The display apparatus 100 may adjust an output setting state of the display based on the stored display output setting history information. For example, the output setting state of the display may include resolution, brightness, contrast ratio, color temperature, text style, text size, and the like. The display apparatus 100 may store sound output setting history. The display apparatus 100 may adjust an output setting state of the speaker based on the stored sound output setting history information. For example, the output setting state of the speaker may include volume, balance, mono/stereoscopic sound, equalizer, and the like. The display apparatus 100 may adjust a display output setting state based on a display output setting history, adjust an output setting state of the display based on the sound output setting history, and output the content in an optimal state.

The display apparatus 100 may display information of the connected external device.

Figure 8:
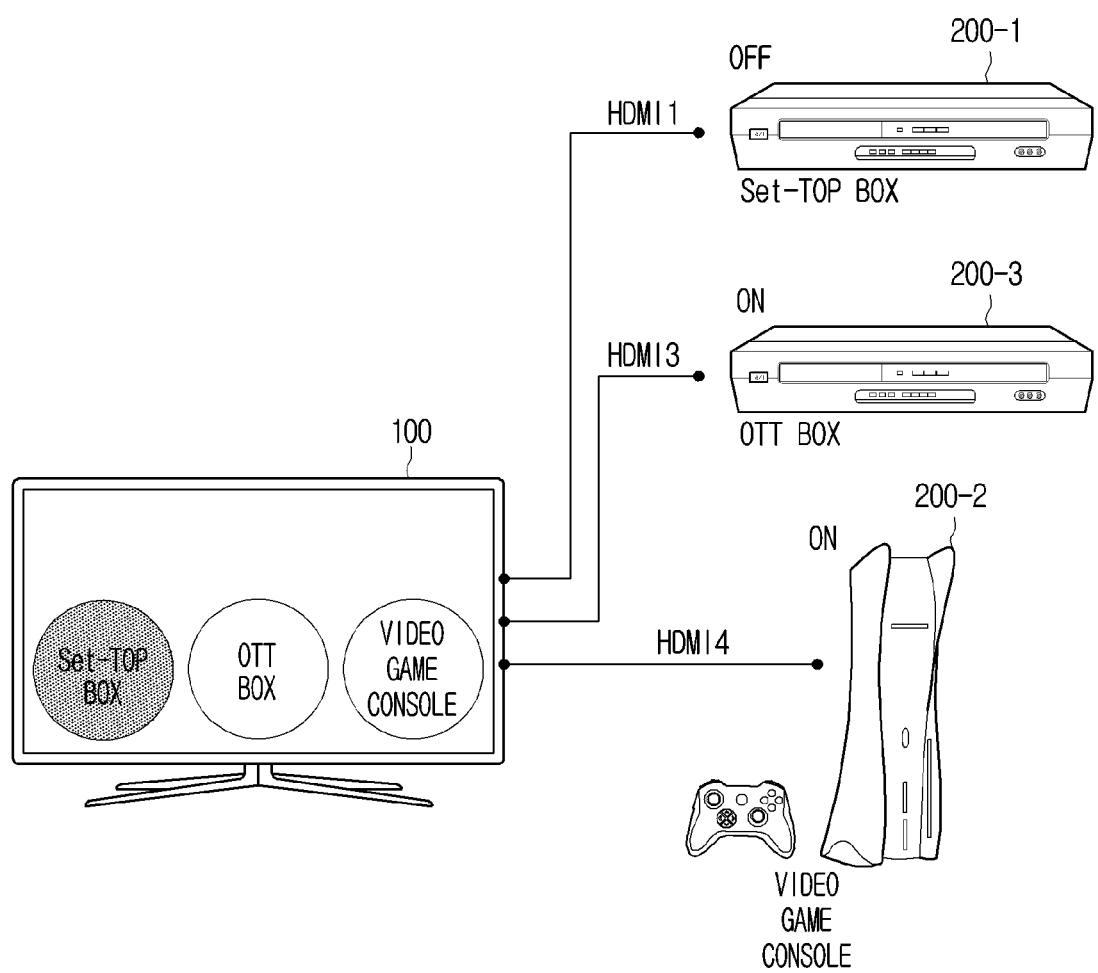
FIG. 8 is a diagram illustrating a display apparatus displaying a state of an external device according to an embodiment of the disclosure.

FIG. 8 is a diagram illustrating a display apparatus displaying a state of an external device according to an embodiment of the disclosure.

Referring to FIG. 8, a display apparatus 100 may be connected to a first external device (e.g., a set top box) 200-1, a second external device (e.g., a video game console) 200-2, and a third external device (e.g., an OTT box) 200-3. The power state of the first external device 200-1 may be an off state, and the power state of the second external device 200-2 and the third external device 200-3 may be an on state. As described above, the display apparatus 100 may determine a power state of each external device 200-1, 200-2, and 200-3 based on a clock signal among signals input from each of each of the external devices 200-1, 200-2 and 200-3. The display apparatus 100 may store information of the external devices 200-1, 200-2, and 200-3. Accordingly, in the example shown in FIG. 8, the display apparatus 100 may determine that the power state of the first external device 200-1 is an off state, and the power state of the second external device 200-2 and the third external device 200-3 is an on state. In addition, the display apparatus 100 may determine that the first external device 200-1 is a set-top box, the second external device 200-2 is an OTT box, and the third external device 200-3 is a video game console.

The display apparatus 100 may display an object corresponding to the set- top box, OTT box, and video game console based on the determined information. For example, an object may be displayed as an image, icon, text formats. The display apparatus 100 may display information related to an external device. For example, the information related to the external device may include information about at least one of power-on state, information of an external device, and channel information. As shown in FIG. 8, the display apparatus 100 may display that the power state of the set-top box is an off state, and the power state of the OTT box and the video game console are an on state. The display apparatus 100 may display information related to an external device for a predetermined time and then make the information disappear. The display apparatus 100 may select one external device according to the criteria described above, and may receive data from the selected external device.

The display apparatus 100 may maintain information related to the external device and select one external device according to the user's command. For example, the display apparatus 100 may select an external device corresponding to a selection signal when a signal for selecting one of the external devices 200-1, 200-2, and 200-3 is received through a remote controller or the like. When the power state of the selected external device is an off state, the display apparatus 100 may transmit a turn-on control signal to turn on the selected external device. The display apparatus 100 may change a receiving setting state and an output setting state based on the selected external device. The display apparatus 100 may receive and output data from a selected external device.

It has been described that the display apparatus 100 receives data from an external device regardless of the current setting state of the display apparatus 100 and the power state of the external device, and outputs data in an optimal state. Hereinafter, a method of controlling a display apparatus will be described.

FIG. 9 is a flowchart illustrating a controlling method of a display apparatus according to an embodiment of the disclosure.

Referring to FIG. 9, if a plurality of external devices are connected, the display apparatus may identify one external device based on usage history, in operation S910, and identify whether an external device is in an on state based on a clock signal included in the input signal of the identified external device, in operation S920. If a clock signal is not included in the input signal of the identified external device, the display apparatus may separate a clock signal from the input signal and may identify whether the external device is turned on based on the separated clock signal. If the signal input from the identified external device is high-definition multimedia interface 2.1, the display apparatus may separate the clock signal by changing a fixed rate link format to transition minimized differential signaling format.

If the identified external device is not in on state, the display apparatus may transmit a control signal to turn on the external device to the external device, in operation S930. The display apparatus may identify a feature of content provided by the identified external device, in operation S940, and may change an output setting state of the display corresponding to the identified feature of the content, in operation S950. The display apparatus may store information about an external device. The display apparatus may identify features of the content based on information on the stored external device. The display apparatus may store output setting history information for the content. The output setting history information may include display output setting history information and sound output setting history information. The display apparatus may adjust the output setting state of the display based on the display output setting history information. As an embodiment, the output setting state of the display may include at least one of resolution, brightness, contrast ratio, color temperature, text style, or text size. In addition, the display apparatus may adjust the output setting state of the speaker based on the sound output setting history information. For example, the output setting state of the speaker may include volume, balance, mono/stereoscopic sound, equalizer, and the like.

The display apparatus may change a signal receiving setting state in a method to correspond to a method of a signal input from the identified external device and may change a receiving channel to a channel to which the identified external device is connected.

When receiving content from an external device, the display apparatus displays the received content based on a changed output setting state of the display, in operation S960. The display apparatus may select one external device without a control process of the user, change the output setting state to correspond to the content of the selected external device, and output the content in an optimal state.

The control method of the display apparatus according to various embodiments may be provided as a computer program product. The computer program product may include a software program itself or a non-transitory computer readable medium in which a software program is stored.

The non-transitory computer-readable medium does not refer to a medium that stores data for a short period of time, such as a register, cache, memory, etc., but semi-permanently stores data and is available of reading by the device. Specifically, programs of performing the above-described various methods may be stored in a non- transitory computer readable medium such as a compact disc (CD), a digital versatile disc (DVD), a hard disk, a Blu-ray disk, universal serial bus (USB), a memory card, ROM, or the like, and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
a communication interface;
a display; and
a processor configured to:
in response to connecting to a plurality of external devices, identify one external device among the plurality of external device based on usage history,
identify whether the one external device is turned on based on a clock signal included in an input signal of the one external device,
based on the one external device not being turned on, transmit, to the one external device, a control signal to turn on the one external device,
identify a feature of content provided by the one external device,
change an output setting state of the display corresponding to the identified feature of content, and
in response to receiving content from the one external device, control the display to display the received content based on the changed output setting state of the display.

2. The display apparatus of claim 1, wherein the processor is further configured to:
based on the clock signal not being included in the input signal of the one external device, separate the clock signal from the input signal, and
based on the separated clock signal, identify whether the one external device is turned on.

3. The display apparatus of claim 2, wherein the processor is further configured to:

based on the input signal of the one external device being a high-definition multimedia interface 2.1, separate the clock signal by changing a fixed rate link format to transition minimized differential signaling format.

4. The display apparatus of claim 1, wherein the processor is further configured to:
change a signal receiving setting state in a method corresponding to a method of a signal input from the one external device.

5. The display apparatus of claim 1, wherein the processor is further configured to:
control the communication interface to change a receiving channel to a channel to which the one external device is connected.

6. The display apparatus of claim 1, wherein the processor is further configured to:
adjust the output setting state of the display based on output setting history displaying the content.

7. The display apparatus of claim 1, wherein the processor is further configured to:
control the display to display information related to each of the plurality of external devices.

8. The display apparatus of claim 7, wherein the information related to each of the plurality of external devices comprises at least one of information about a power-on state, information about one or more external devices, or channel information.

9. The display apparatus of claim 7, wherein the processor is further configured to:
based on receiving a signal through the communication interface to select one or more external devices among the plurality of external devices, select the one or more external devices corresponding to the signal; and
based on receiving content from the selected one or more external devices, control the display to display the received content.

10. The display apparatus of claim 1, wherein the output setting state of the display comprises at least one of resolution, brightness, contrast ratio, color temperature, text style, or text size.

11. A method of controlling of a display apparatus, the method comprising:
in response to connecting to a plurality of external devices, identifying one external device among the plurality of external devices based on usage history;
identifying whether the one external device is turned on based on a clock signal included in an input signal of the one external device;
based on the one external device not being turned on, transmitting, to the one external device, a control signal to turn on the one external device;
identifying a feature of content provided by the one external device;
changing an output setting state of a display of the display apparatus, the output setting state corresponding to the identified feature of the content; and
in response to receiving content from the one external device, displaying the received content based on the changed output setting state of the display.

12. The method of claim 11, wherein the identifying of whether the one external device is turned on comprises:
based on the clock signal not being included in the input signal of the one external device, separating the clock signal from the input signal; and
based on the separated clock signal, identifying whether the one external device is turned on.

13. The method of claim 12, wherein the identifying of whether the one external device is turned on comprises, based on the input signal of the one external device being a high-definition multimedia interface 2.1, separating the clock signal by changing a fixed rate link format to transition minimized differential signaling format.

14. The method of claim 11, further comprising:
changing a signal receiving setting state in a method corresponding to a method of a signal input from the one external device.

15. The method of claim 11, further comprising:
changing a receiving channel to a channel to which the one external device is connected.

16. The method of claim 11, wherein the output setting state of the display corresponds to an output setting value of a resolution, a brightness, a contrast ratio, color temperature, a text style, and a text size.

17. The method of claim 11, wherein the identifying of the one external device among the plurality of external devices comprising selecting the one external device based on a pattern of use of the one external device included in the usage history.

18. The method of claim 11, wherein the changing of the output setting state comprises adjusting a display output setting state based on a display output setting history and adjusting an output setting state of the display based on a sound output setting history.

* * * * *